United States Patent
Galbiati et al.

(10) Patent No.: US 6,385,067 B2
(45) Date of Patent: May 7, 2002

(54) ANALOG/DIGITAL PWM CONTROL CIRCUIT OF A WINDING

(75) Inventors: Ezio Galbiati, Agnadello; Maurizio Nessi, Como; Marco Palestra, Bergamo, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/814,176

(22) Filed: Mar. 21, 2001

(30) Foreign Application Priority Data

Mar. 23, 2000 (EP) .............................................. 00830225

(51) Int. Cl.[7] ......................................... H02M 7/5387
(52) U.S. Cl. ...................................................... 363/132
(58) Field of Search ........................... 363/17, 132, 41, 363/56.02

(56) References Cited

U.S. PATENT DOCUMENTS

| | | | |
|---|---|---|---|
| 4,325,112 A | * 4/1982 | Otsuka | 363/42 |
| 4,802,079 A | * 1/1989 | Mizoguchi | 363/71 |
| 5,309,079 A | 5/1994 | Takada | 318/811 |

FOREIGN PATENT DOCUMENTS

| | | |
|---|---|---|
| EP | 0 760 552 A1 | 3/1997 |
| EP | 0 892 500 A1 | 1/1999 |
| EP | 0 897 213 A1 | 2/1999 |

* cited by examiner

Primary Examiner—Shawn Riley
(74) Attorney, Agent, or Firm—Lisa K. Jorgenson; Allen, Dyer, Doppelt, Milbrath & Gilchrist, P.A.

(57) ABSTRACT

A feedback control circuit is for the current in a load formed by a winding in series with a current sensing resistor, coupled to a full-bridge output stage, an amplifier coupled to the terminals of the sensing resistor, and a controller fed with the output of the amplifier and with a voltage reference and producing a correction signal. The circuit has a PWM converter for generating a pair of control signals. The PWM converter includes an up/down counter producing a count value and logic circuitry that produces the twos-complement of the correction signal. A pair of registers are coupled to the outputs of the controller and of the logic circuitry. A first comparator coupled to the outputs of the counter and of the first register produces the first control signal, if the count signal exceeds the value stored in the first register. A second comparator coupled to the counter and to the second register produces the second control signal, if the count signal overcomes the value stored in the second register.

16 Claims, 3 Drawing Sheets

US 6,385,067 B2

ANALOG/DIGITAL PWM CONTROL CIRCUIT OF A WINDING

FIELD OF THE INVENTION

The present invention relates to the field of pulse width modulation (PWM), and, more particularly, to a circuit for controlling the current flowing in a winding driven in PWM mode through a full-bridge stage.

BACKGROUND OF THE INVENTION

In a PWM switching regulator, a square wave drives the control terminal of a switch of a full-bridge stage determining its ON or off state. Alternating conduction states to nonconduction states, the load driven by the full-bridge stage will be either crossed by a current or not whose mean value during a turn-on and a turn-off phase can be controlled by varying the duty cycle of the driving square wave.

A particularly effective method of controlling a full-bridge is the one disclosed in U.S. Pat. No. 5,917,720 issued to the same assignee. A block diagram of a circuit implementing the method, including by a control loop of the PWM driver at a constant frequency, is depicted in FIG. 1. The point of interest of this method is that the current flowing in the load is controlled by varying the respective duty cycle of the two outputs OUT+ and OUT– of the power stage Power_Ampl. By increasing the duty cycle of the output OUT+ and by decreasing the duty cycle of the output OUT– or vice versa, a current having direction and intensity that depend on the difference between the duty cycles of the outputs is forced in the load.

The current is controlled by detecting the voltage drop on a current sensing resistance connected in series to the winding to be controlled, amplifying this voltage drop with an operational amplifier Sense_Ampl that produces a feedback voltage, and closing the feedback loop with the amplifier Error_Ampl, that compares the feedback voltage with a reference value representing the desired current value. The output Err_Out of the amplifier Error_Ampl is compared with two reference triangular wave signals Tria1 and Tria2 of opposite phases thus generating the two driving signals In+ and In– of the power stage.

An important aspect of such a system is that the two signals Tria1 and Tria2 of opposite phase must be precisely generated with the same amplitude and with a mean value equal to the reference voltage Vref to which the Sense_Ampl and the Error_Ampl are referred. This is not easy to achieve because of the offset of the operational amplifiers that make the generation of the two triangular wave oscillating signals critical and very often the two signals are not perfectly symmetrical and do not have the same mean value Vref.

This results in a degradation of the performance of the current control when operating at low currents and particularly when controlling at null current. In fact in that situation, by setting the input voltage Vctl equal to the reference voltage Vref, the output Err_Out of the Error_Ampl tends to equal Vref. However, because of asymmetries and unbalances of the two triangular wave references, the two driving signals of the power stage In+ and In– do not result perfectly in phase and do not have the same duty cycle and so the differential voltage applied to the load is not null, but assumes a value proportional to the difference between the two triangular wave voltage references.

It is evident that there is a need for a PWM current control circuit that prevents such a degradation of the control at a relatively low level of current in the load.

SUMMARY OF THE INVENTION

It is an object of the present invention to provide a partly analog and partly digital circuit controlling, through a feedback loop, the current flowing in a winding of an induction machine, such as a DC motor or a Voice Coil Motor, that overcomes the drawback of known circuits. The current flowing in the load is delivered by a full-bridge stage driven by a PWM digital converter.

More precisely, the invention includes a feedback control circuit of the current flowing in a load formed by a winding in series to a current sensing resistor. The circuit comprises an output full-bridge stage, driven by a pair of first and second control signals. The circuit may also include an amplifier having a noninverting and an inverting input respectively coupled to the terminals of the current sensing resistor for producing an amplified replica of the voltage drop on the sensing resistor. The circuit may also include a controller coupled to the output of the amplifier and to a reference voltage representing a desired value of the current in the load for producing a correction signal. In addition, the circuit may include a PWM converter coupled to the output of the controller and to a clock signal for generating the pair of control signals.

The point of interest of the control circuit of the invention includes the structure of the PWM converter that comprises an up/down counter fed with the clock signal, producing a certain count, combinatory logic circuitry coupled to the output of the controller producing a signal that is the twos-complement of the correction signal, and a pair of first and second registers coupled to the outputs of the controller and of the combinatory logic circuitry, respectively. Also, a first comparator is coupled to the outputs of the counter and of the first register for producing the first control signal if the count exceeds the value stored in the first register. A second comparator is coupled to the counter and to the second register for producing the second control signal if the count overcomes the value stored in the second register. According to a preferred embodiment of the invention the controller can be realized by an adder coupled to the reference voltage and to the output of the amplifier producing an error signal, and a correction filter coupled to the output of the adder, producing the correction signal.

BRIEF DESCRIPTION OF THE DRAWINGS

The different aspects and advantages of the invention will become clearer through the following detailed description and by referring to the attached drawings wherein.

DETAILED DESCRIPTION OF PREFERRED EMBODIMENTS

The present invention is directed to a PWM current control circuit that overcomes the mentioned problem of lack of precision when controlling driving, at minimum or null value, of the current flowing in the load caused by asymmetry and unbalances between the two triangular wave references.

Figure 1:
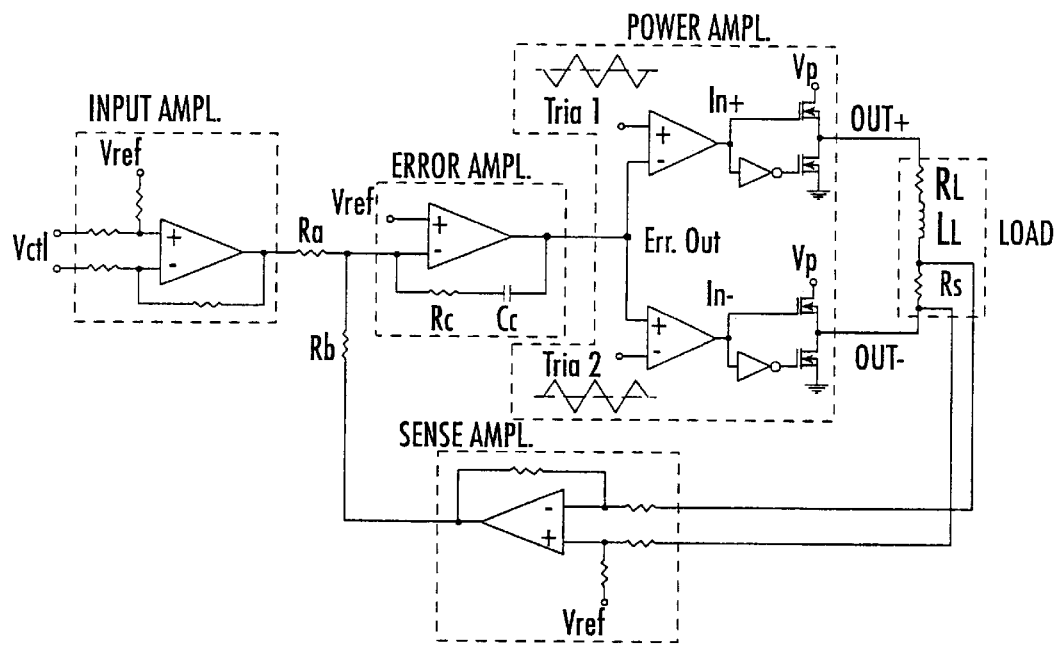
FIG. 1 is a schematic block diagram of a current control loop according to the prior art.
Figure 2:
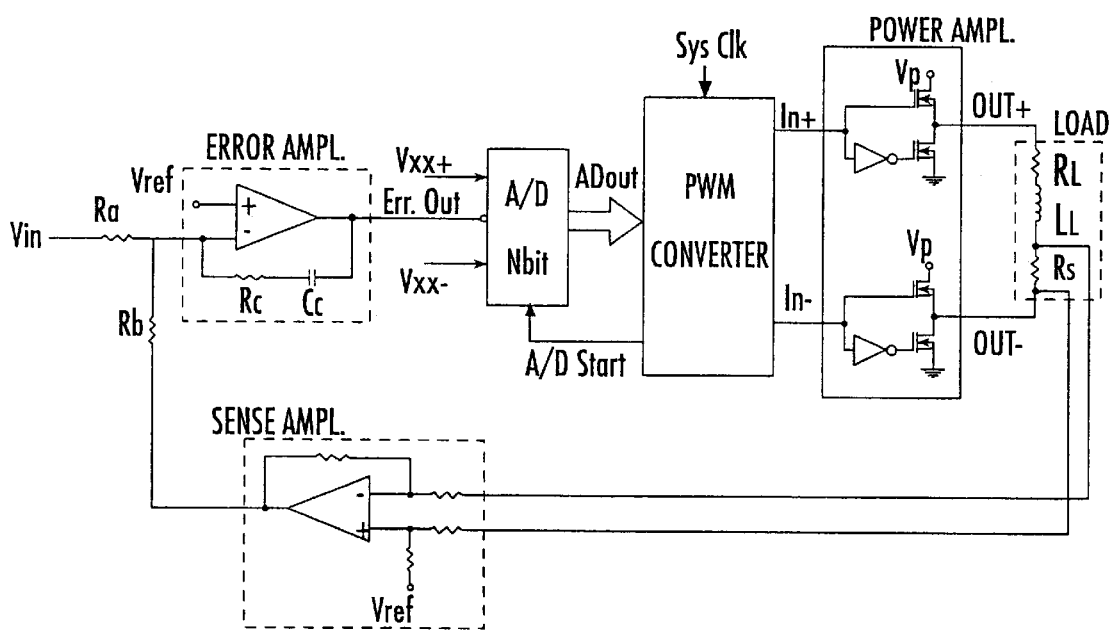
FIG. 2 is a schematic block diagram of the current control loop in accordance with the invention.

A block diagram of an embodiment of the mixed analog/digital circuit of the invention is depicted in FIG. 2. The use of analog circuits together with digital circuits becomes very convenient because it makes possible the realization of a system that is perfectly compatible with the systems used at present wherein the driving voltage interface is an analog circuit, and to obtain an improved precision and ruggedness in generating the driving signals for the power stage. In fact the generation of these signals is done by a digital circuit that is practically exempt from the above mentioned asymmetry and unbalance problems.

The purely analog part of the circuit includes the sensing amplifier Sense_Ampl and the error amplifier Error_Ampl. The Sense_Ampl detects the current flowing in the load and the sensing resistor Rs producing an amplified voltage that is fedback and compared with the input voltage Vin, representing the desired value of the current to be forced in the winding.

The error signal resulting from the comparison is amplified by the Error_Ampl that also guarantees stability and a reduction of the high frequency components via the compensation network Rc and Cc. In this way, a quality detection of the current in the load and an outstanding precision in controlling the current is obtained while using the same analog interface with the driving voltage Vin as in known circuits.

The analog to digital converter A/D, which in FIG. 2 is depicted as an N bit converter, couples the analog part with the digital part of the current control loop. In the example considered, N is equal to 8 and so the output of the A/D converter is an integer number between 0 and 255. Of course, N may also be different from 8. The input dynamic of the A/D converter is established by the two references maximum Vxx+ and minimum Vxx− and is centered on the value of Vref. In this way, if the output of the Error_Ampl is equal to Vref, the output of the A/D converter is equal to 128. If the output of the Error_Ampl is equal to or lower than Vxx−, the output of the A/D converter is equal to 0. While if the output of the Error_Ampl is equal to or greater than Vxx+, the output of the A/D converter is equal to 255.

The digital conversion of the output voltage of the Error_Ampl is carried out in a synchronous manner in respect to the switching of the output stage and is commanded by the enable signal ADstart produced by the PWM_Converter.

Figure 3:
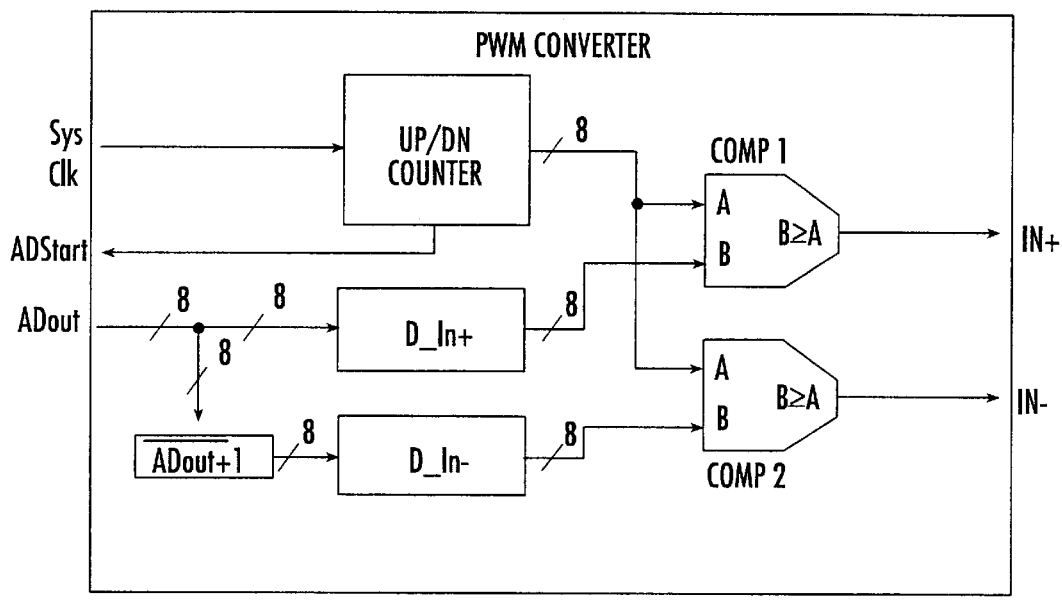
FIG. 3 is a schematic block diagram of the PWM Converter of FIG. 2.

A block diagram of the PWM_Converter of the circuit of the invention is depicted in FIG. 3. It comprises two registers D_In+ and D_In−, whereby the value ADout produced by the A/D converter is written in the first register and the twos-complement of the bit-string representing the value is written in the second register, an up/down counter Up/Dn_Counter and two digital comparators Comp1 and Comp2. The counter and the comparators are of 8 bits in this example.

The counter Up/Dn_Counter is increased and/or decreased at the rate of a system clock signal SysClk, determining with a complete up and down count cycle the switching frequency of the current in the load. The data ADout is complemented to two by producing a complement signal which, summed to ADout, provides a value equal to the number of states of the counter. In such a way, the digital comparators Comp1 and Comp2 will produce two signals having complementary duty cycles, i.e. duty cycles whose sum is equal to 1. It is important that such a condition be verified to make the difference between the duty cycles of In+ and In−, that determines the intensity of the current forced in the load, vary in the broadest possible range, i.e. between −1 and +1.

The contents of the two registers D_In+ and D_In− are compared with the output of the Up/Dn_Counter by the digital comparator Comp1 and by the digital comparator Comp2, respectively. The control signals In+ and In− of the comparators are respectively active when the value stored in D_In+ or in D_In− are equal to or greater than the output of the counter. The enabling signal of the analog/digital conversion is generated by the PWM_Converter, for example, each time the Up/Dn_Counter attains the values 0 and 255, or when it assumes the value of 128 or even in both cases.

Such a choice depends on the desired sampling frequency and on the conversion speed of the A/D that is used. The case in which the enable signal ADstart is generated when the output of the Up/Dn_Counter is equal to 0 or 255, will be considered by way of example. If the Error_Ampl produces a voltage Err_Out whose value is converted in the digital number ADout=128, then the PWM_Converter generates two signals In+ and In− having the same phase and duty cycle equal to 50%, because the registers D_In+ and D_In− will contain the same value. In fact if ADout=128, the two registers D_In+ and D_In− will contain the same value so that the comparators Comp1 and Comp2 generate the same result In+ and In− identical having the same phase and duty cycle equal to 50%.

It is clear that in such a condition the current in the load is null because the two branches of the full-bridge output stage are driven by two signals with the same phase and the same duty cycle, so even if the current terminal OUT+ and OUT− of the load are continuously switched from GND to the supply voltage Vp, across the load the potential difference is null. Should a current be forced in the load, from OUT+ to OUT−, the input data Vin must be greater than Vref and as a consequence, when the control loop reaches a stable condition, the output of the Error_Ampl assumes a value greater than Vref.

Figure 4:
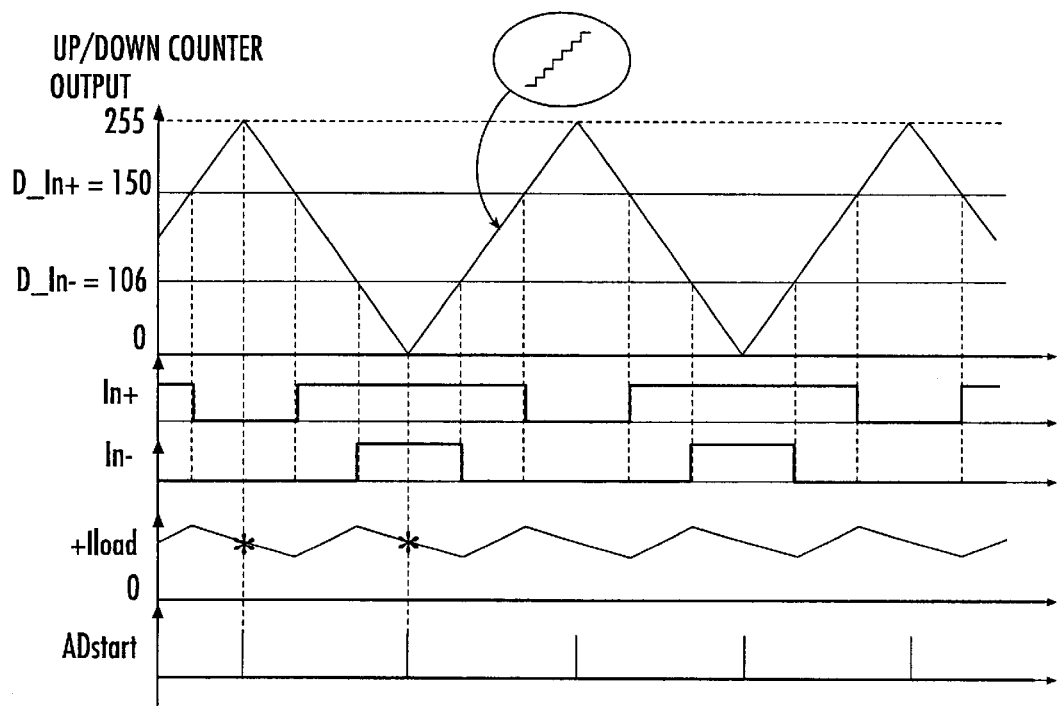
FIG. 4 is a waveform diagram showing the waveforms of operation of the PWM Converter.

The digital conversion of the output of the Error_Ampl produces a number between 128 and 255, for example 150. The PWM_Converter stores this data in the register D_In+, while the value 106 (i.e. the complement to two of the 8 bits string representing the number 150) is stored in the register D_In−. The comparators Comp1 and Comp2 compare the content of the registers D_In+ and D_In− with the output of the counter Up/Dn_Counter generating a signal In+ with duty cycle greater than 50% and a signal In− with duty cycle lower than 50% respectively, as depicted in FIG. 4. On the contrary, should a current be forced in the load, from OUT− to OUT+, the input data Vin must be lower than Vref and as a consequence, when the control loop reaches a stable condition, the output of the Error_Ampl assumes a value lower than Vref.

Figure 5:
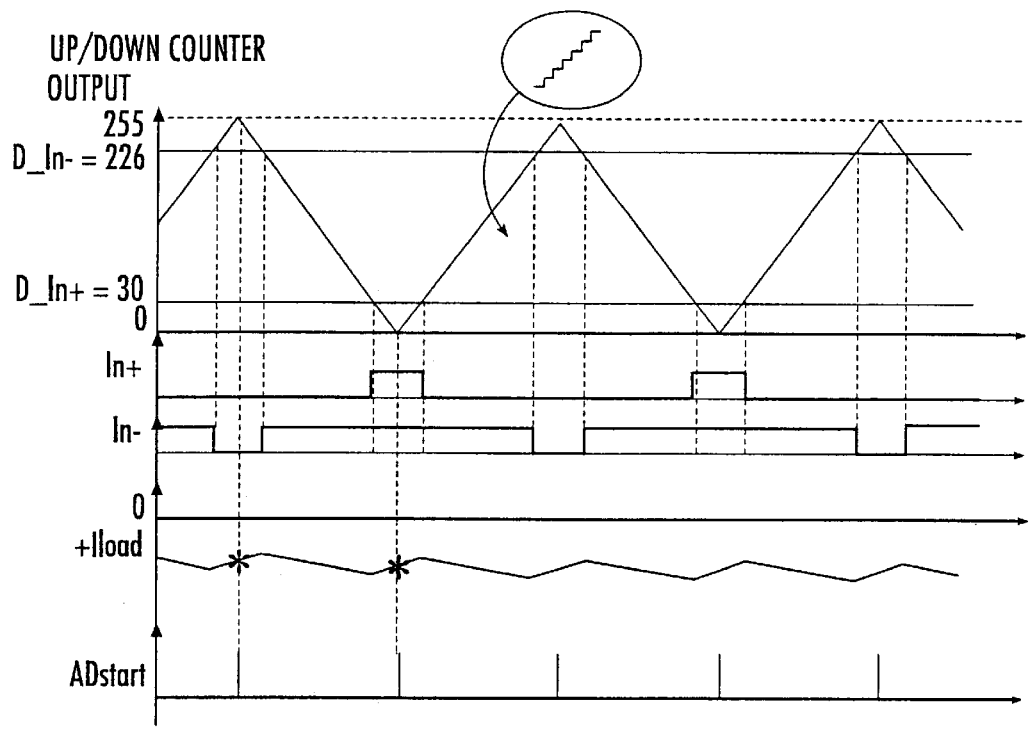
FIG. 5 is another waveform diagram showing the waveforms of operation of the PWM Converter.
Figure 6:
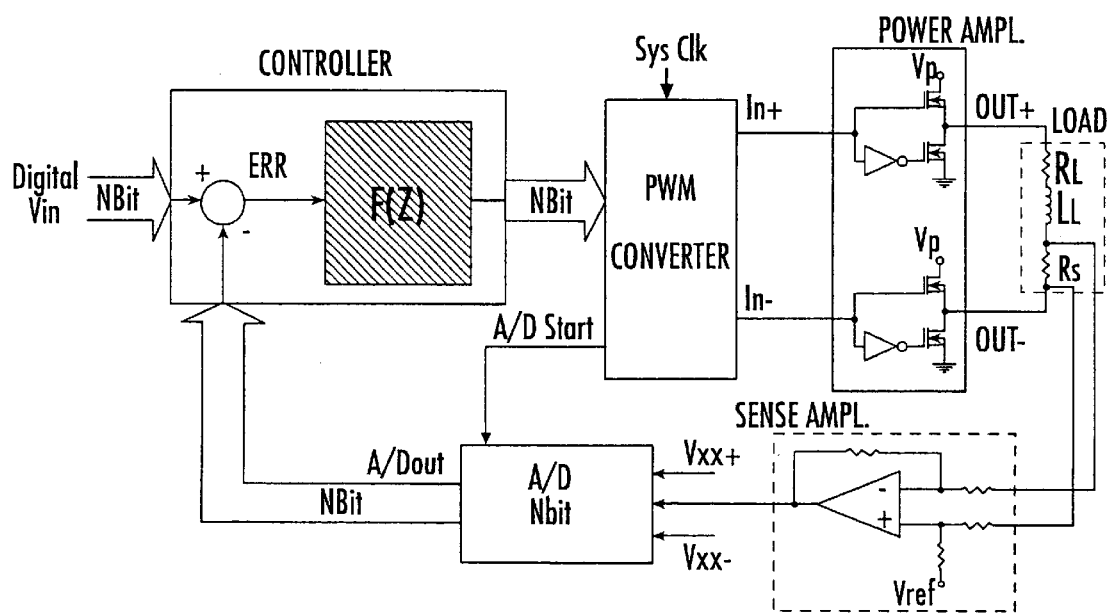
FIG. 6 is a schematic block diagram of an alternative embodiment of the current control loop in accordance with the invention.

The digital conversion of the output of the Error_Ampl produces a number between 0 or 128, for example 30. The PWM_Converter stores this data in the register D_In+, while the value 226 (i.e. the twos-complement of the 8 bit string representing the number 30) is stored in the register D_In−. The comparators Comp1 and Comp2 compare the content of the registers D_In+ and D_In− with the output of the Up/Dn_Counter generating a signal In+ with duty cycle lower than 50% and a signal In− with duty cycle greater than 50%, respectively, as depicted in FIG. 5.

In both cases it is possible to note that the enable signal of the A/D converter is synchronous with the peaks of the triangular wave produced by the Up/Dn_Counter. Therefore, the digital conversion of the output of the Error_Ampl is carried out in the middle of the free-wheeling phase of the current in the load, when both the outputs OUT+ and OUT− are coupled to GND or to Vp.

The block diagram of another embodiment of the PWM current control circuit of the invention, is different from the one of FIG. 2 because it is almost completely digital. According to this alternative embodiment, the analog/digital conversion is carried out at the output of the Sense_Ampl, producing a feedback signal of the control loop in digital form that allows a digital embodiment of the controller.

The input datum Digital_Vin, representing the value of the desired current in the load, is in digital form and is fed together with the feedback signal to the Controller. The controller may be realized by hard wired logic and provides for summation amplification and filtering of the error signal Err with a certain transfer function F(z) satisfying the bandwidth constraint and ensuring stability to the current control loop.

At each sampling of the voltage produced by the Sense_Ampl, determined by the signal ADstart, the controller calculates the error signal Err as the difference between the input datum Digital_Vin indicating the current to be forced in the load and the feedback datum Aout, thereby producing by the filter F(z) the desired correction signal. A generic digital filter F(z) can be described by the following polynomial:

$$y_n = a_0 x_n + a_1 x_{n-1} + \ldots + b_1 y_{n-1} + b_2 y_{n-2} + \ldots$$

wherein $x_i$ is the i-th input, $y_i$ is the i-th output and the dots indicate that there are other terms that depend on the order of the filter.

The calculation of a filter generally needs M+N+1 products, where M is the order of the numerator and N the order of the denominator of the transfer function, and M+N sums. This must be considered when designing the filter because, when the adder has produced the error value Err, the filter F(z) must be able to complete its computations before the next ADstart signal.

Once the coefficients, and the signals and have been quantized, the filter is calculated with an infinite precision. Therefore, in designing the filter it is necessary to avoid internal saturations and thus provide a sufficiently high number of bits for each internal signal. In particular it is more convenient to assign to the coefficients of the filter, a sufficiently high number of bits to prevent the calculation of the filter from introducing an excessive quantization noise.

According to a preferred embodiment of the invention, the filter F(z) is an IIR filter of the first order, whose transfer function is:

$$H(z) = \frac{a_0 z + a_1}{b_0 z + b_1}$$

Depending on the desired performances in terms of bandwidth and phase margin of the current control loop, the order of the filter can be changed.

That which is claimed is:

1. A feedback control circuit for current flowing in a load comprising a winding in series with a current sensing resistor, the feedback control circuit comprising:
   a full-bridge stage coupled to the load, and for being driven by first and second control signals;
   an amplifier having a noninverting input and an inverting input for respectively coupling to the sensing resistor, and for producing an amplified replica voltage of a voltage drop on the sensing resistor;
   a controller for receiving an output of said amplifier and a reference voltage representing a desired value of the current in the load, and for producing a correction signal;
   a pulse width modulating (PWM) converter for receiving the correction signal from said controller and a clock signal, and for generating the first and second control signals, said PWM converter comprising
      an up/down counter receiving the clock signal, and for producing a count value,
      a logic circuit for receiving the correction signal from said controller, and for producing a twos-complement signal based on the correction signal,
      first and second registers respectively receiving the correction signal from said controller and the two's-complement signal from the logic circuit,
      a first comparator coupled to said up/down counter and said first register for producing the first control signal when the count value exceeds a value stored in the first register, and
      a second comparator coupled to said up/down and said second register for producing the second control signal when the count value exceeds a value stored in the second register.

2. The feedback control circuit according to claim 1 wherein said controller comprises:
   an adder for receiving the reference voltage and the output of said amplifier, and for producing an error signal; and
   a correction filter for receiving the error signal from said adder, and for producing the correction signal.

3. The feedback control circuit according to claim 2, wherein said counter produces an enable flag each time it attains one of a top count value and a bottom count value; wherein said controller comprises an analog/digital converter enabled by said enable flag, coupled to the output of said amplifier, and providing information representing the amplified replica voltage to said PWM converter; and wherein said correction filter comprises an infinite impulse response digital filter (IIR).

4. The feedback control circuit according to claim 1, wherein said counter produces an enable flag each time it attains one of a top count value and a bottom count value; wherein said controller includes an error amplifier for receiving the reference voltage and the output of said amplifier, for producing an intermediate error signal, and an analog/digital converter enabled by the enable flag and coupled to an output of said error amplifier for producing the correction signal.

5. A feedback control circuit for a load comprising a winding in series with a current sensing resistor, the feedback control circuit comprising:
   a full-bridge stage coupled to the load and driven by first and second control signals;
   an amplifier for producing an amplified replica voltage of a voltage drop on the sensing resistor;
   a controller for receiving the amplified replica voltage from said amplifier and a reference voltage, and for producing a correction signal;
   a pulse width modulating (PWM) converter for receiving the correction signal from said controller and a clock signal, and for generating the first and second control signals, said PWM converter comprising
      an up/down counter receiving the clock signal, and for producing a count value, a logic circuit for reciving the correction signal from said controller, and for producing a two's-complement signal, a first register for storing a first value based upon the correction signal, a second register for for storing a second value based upon the two's-complement signal, and first and second comparators for producing the first and second control signals based upon the count value and the values stored in the first and second registers.

6. The feedback control circuit according the claim 5 wherein said controller comprises:

an adder for receiving the reference voltage and the amplified replica voltage from said amplifier, and for producing an error signal; and a correction filter for receiving the error signal from said adder, and for producing the correction signal.

7. The feedback control circuit according to claim 6, wherein said counter produces an enable flag; wherein said controller comprises an analog/digital converter enabled by said enable flag, for receiving the amplified replica voltage from said amplifier and for providing information representing the amplified replica voltage to said PWM converter; and wherein said correction filter comprises an infinite impulse response digital filter (IIR).

8. The feedback control circuit according to claim 5, wherein said counter produces an enable flag; wherein said controller includes an error amplifier for receiving the reference voltage and the amplified replica voltage from said amplifier and produces an intermediate error signal, and an analog/digital converter enabled by the enable flag and receiving the intermediate error signal from said error amplifier for producing the correction signal.

9. A method of controlling a current in a load comprised of a winding in series with a current sensing resistor, the method comprising:

coupling a full-bridge stage to the load;

producing an amplified replica voltage of a voltage drop on the sensing resistor;

producing a correction signal based upon the amplified replica voltage and a reference voltage;

providing a pulse width modulating (PWM) converter for receiving the correction signal from said controller and a clock signal, and for generating first and second control signals to control the full bridge stage by producing a count value based upon the clock signal, producing a two's-complement signal based upon the correction signal, storing a first value based upon the correction signal, storing a second value based upon the two's-complement signal, and producing the first and second control signals based upon a comparison of the count value and the first and second values.

10. The method according to claim 9 wherein producing the correction signal comprises producing an error signal based upon the reference voltage and the amplified replica voltage; and producing the correction signal with a correction filter based upon the error signal.

11. The method according to claim 10, wherein the count value is produced by a counter which also produces an enable flag; wherein the correction signal is produced by a controller comprising an analog/digital converter enabled by the enable flag, for receiving the amplified replica voltage from the amplifier and for providing information representing the amplified replica voltage to the PWM converter; and wherein the correction filter comprises an infinite impulse response digital filter (IIR).

12. The method according to claim 9, wherein the count value is produced by a counter which also produces an enable flag; wherein the correction signal is produced by a controller comprising an error amplifier receiving the reference voltage and the amplified replica voltage for producing an intermediate error signal, and an analog/digital converter enabled by the enable flag and receiving the intermediate error signal from said error amplifier for producing the correction signal.

13. A method of making a feedback control circuit for controlling a current in a load comprised of a winding in series with a current sensing resistor, the method comprising:

coupling a full-bridge stage to the load;

coupling an amplifier to the sensing resistor to produce an amplified replica voltage of a voltage drop on the sensing resistor;

providing a controller to produce a correction signal based upon the amplified replica voltage from the amplifier and a reference voltage;

providing a pulse width modulting (PWM) converter for receiving the correction signal from said controller and a clock signal, and for generating first and second control signals to control the full bridge stage, the PWM converter comprising an up/down counter receiving the clock signal, and for producing a count value, a logic circuit for receiving the correction signal from said controller, and for producing a two's-complement signal, a first register for storing a first value based upon the correction signal, a second register for for storing a second value based upon the two's-complement signal, and first and second comparators for producing the first and second control signals based upon the count value and the values stored in the first and second registers.

14. The method according to claim 13 wherein said controller comprises:

an adder for receiving the reference voltage and the amplified replica voltage from said amplifier, and for producing an error signal; and a correction filter for receiving the error signal from said adder, and for producing the correction signal.

15. The method according to claim 14, wherein said counter produces an enable flag; wherein said controller comprises an analog/digital converter enabled by said enable flag for receiving the amplified replica voltage from said amplifier and for providing information representing the amplified replica voltage to said PWM converter; and wherein said correction filter comprises an infinite impulse response digital filter (IIR).

16. The method according to claim 13, wherein said counter produces an enable flag; wherein said controller includes an error amplifier for receiving the reference voltage and the amplified replica voltage from said amplifier, and for producing an intermediate error signal, and an analog/digital converter enabled by the enable flag and receiving the intermediate error signal from said error amplifier for producing the correction signal.

* * * * *